United States Patent [19]

Carroll et al.

[11] 4,297,312
[45] Oct. 27, 1981

[54] METHOD FOR PREPARING STYLUS LAPPING DISCS

[75] Inventors: Charles B. Carroll, Trenton; Howard G. Scheible, Livingston, both of N.J.

[73] Assignee: RCA Corporation, New York, N.Y.

[21] Appl. No.: 118,088

[22] Filed: Feb. 4, 1980

[51] Int. Cl.³ .................. B32B 3/26; B29C 1/02; B28B 19/00
[52] U.S. Cl. .................. 264/134; 51/209 DL; 51/281 R; 264/107; 264/219; 264/225; 264/239; 264/255; 346/137; 369/126; 369/151; 430/306; 430/315; 430/324; 430/347
[58] Field of Search .......... 264/129, 137, 134, 106, 264/107, 255, 239, 219, 225; 204/3, 4, 5, 6; 346/137, 134; 369/126, 151; 51/281 R, 209 DL; 430/306, 315, 324, 347

[56] References Cited

U.S. PATENT DOCUMENTS

| | | | |
|---|---|---|---|
| 3,842,194 | 10/1974 | Clemens | 178/6.6 A |
| 3,882,214 | 5/1975 | Nosker et al. | 264/106 |
| 3,950,173 | 4/1976 | Ross et al. | 346/74 CR X |
| 4,104,832 | 8/1978 | Keizer | 51/281 R |
| 4,162,510 | 7/1979 | Keizer | 358/128 |
| 4,211,617 | 7/1980 | Hunyar | 204/5 |

OTHER PUBLICATIONS

Ryan, RCA Review, vol. 39, pp. 87–115 (1978).
Firester, RCA Review, vol. 39, pp. 427–471 (1978).

Primary Examiner—Edward C. Kimlin
Attorney, Agent, or Firm—Birgit E. Morris; Allen Bloom

[57] ABSTRACT

An improved method of reproducing a spiral groove pattern in the surface of a plastic disc wherein the intersections of the surface of a metal article generated during the replication process are filled in to form concave junctions.

4 Claims, 10 Drawing Figures

METHOD FOR PREPARING STYLUS LAPPING DISCS

This invention relates to a method of replicating a spiral groove pattern. More particularly, this invention relates to a method of preparing keel lapping discs which can be used to fabricate playback styli having longer life.

BACKGROUND OF THE INVENTION

U.S. Pat. No. 3,842,194 of Clemens discloses a video disc having a playback system utilizing variable capacitance. In one configuration of the Clemens system, information representative of recorded picture and sound is encoded in the form of a relief pattern in a relatively fine spiral groove on the surface of a disc record. For example, groove widths about 3.5 micrometers and groove depths of about 1.0 micrometer may be used. During playback, a pickup stylus about 2.0 micrometers wide having a thin conductive electrode thereon, for example, about 0.2 micrometer thick, engages the groove as the record is rotated by a supportive turntable. Capacitive variations between the stylus electrode and the record surface are sensed to recover the prerecorded information.

Keizer, in U.S. Pat. No. 4,162,510 entitled, "Keel Tipped Stylus for Video Disc Systems", which is incorporated herein by reference, discloses a playback stylus which may be used with the Clemens system. The keep tipped pickup stylus comprises a dielectric support element having a body, a constricted terminal portion and shoulders interconnecting the body with the constricted terminal portion.

The constricted terminal portion is defined by a prow, a substantially flat rear surface remote from said prow, side surfaces extending from the side edges of the rear surface, a bottom surface, which preferably conforms to the groove shape, extending from the bottom edge of the rear surface and a plurality of additional surfaces extending from the prow and intersecting the bottom and the side surfaces. The maximum separation between the substantially parallel side surfaces is less than the given groove width.

A companion U.S. Pat. No. 4,104,832, incorporated herein by reference, discloses a method for manufacturing the keel tipped stylus. A tapered dielectric support element made from a hard material, such as diamond or sapphire, is contacted with an abrasive lapping disc having a deep, trapezoidal, coarse pitched groove. The lands on the lapping disc lap the shoulders of the keel tipped stylus and the walls of the abrasive groove form the substantially parallel side surfaces of the constricted terminal portion.

Abrasive discs can be generated by a method described by Ryan, "Material and Process Development for Video Disc Replication", *RCA Review*, Vol. 39, pages 87–115 (1978). A master recording is generally made in photoresist by optical recording techniques, although other recording methods such as electron beam or electromechanical means can also be employed. A metal matrix master, which is a negative replica of the surface of the photoresist master recording, is prepared from the master recording. A metal matrix mold, which is a positive replica of the master recording, is prepared from the matrix master. A metal stamper is then prepared from the matrix mold. The stamper is a negative of the photoresist master recording and is used to press plastic discs having the appropriate groove geometry which are then coated with an abrasive.

A problem has been encountered in using the above procedure. The keel-tipped styli prepared by the Keizer method sometimes break during playback, causing damage to the video disc and requiring replacement.

SUMMARY OF THE INVENTION

We have found an improved method of reproducing a spiral groove pattern in the surface of a plastic disc wherein the intersection of the surfaces of a metal article generated during the replication process are filled in to form concave junctions.

DETAILED DESCRIPTION OF THE INVENTION

A convenient method of preparing a suitable, spiral, deep-grooved photoresist master is by means of optical recording techniques. For example, see the discussion in the article by A. H. Firester et al. entitled, "Optical Recording Techniques for the RCA Video Disc", *RCA Review*, Vol. 39, No. 3, pgs. 427–471 (1978).

Suitable photoresists for this application include Shipley AZ1350, available from Shipley Co., and a photoresist comprising a mixture of 2,4-bis (6-diazo-5, 6-dihydro-5-oxo-1-naphthylenesulfonyloxy)-benzophenone and an alkali soluble novolak resin prepared from cresol and formaldehyde, as described in Ross, U.S. Pat. No. 3,950,173, incorporated herein by reference. A solution of about 28–32 percent weight to volume of an 8.5 to 1.5 novalak to diazoquinone formulation in 2-methoxyethyl acetate has been found to be particularly useful.

The photoresist is applied to any smooth substrate to which the photoresist adheres. A particularly useful substrate is a bright copper layer electroplated onto a smoothly machined, flat aluminum disc. The copper layer may be given a fine machined finish and the photoresist solution is applied so as to produce a solvent-free layer, typically about 3–5 micrometers thick, which is uniform and pinhole free. A convenient way of applying the photoresist solution is by spin coating although other means such as spraying or brushing may be used. The resist layer can then be baked to remove any residual solvent.

The desired spiral trapezoidal groove of the lapping disc can be recorded by exposing the photoresist layer to a laser optical recording system. Following exposure, the photoresist layer is developed by contacting it with a solvent developer which selectively removes the exposed, more soluble portions of the photoresist layer.

Figure 1:
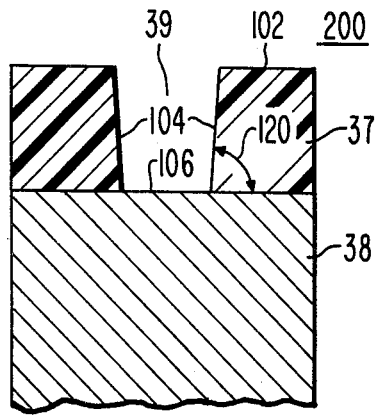
FIG. 1 is a cutaway transverse view of the groove of a photoresist master.

FIG. 1 is a cutaway transverse view of one groove 200 of the photoresist master recording after development showing a substrate 38 having a photoresist layer 37 thereon and an opening 39 in the photoresist layer 37. The groove 200 has well defined edges between the photoresist surface 102 and the photoresist walls 104 of the photoresist layer 37, as well as between the photoresist walls 104 and the surface 106 of the substrate 38.

The angle 120 at the intersection of the photoresist walls 104 and the substrate surface 106 is greater than 90° in order to facilitate separation of the articles produced during the replication process. The depth of the groove measured between the photoresist surface 102 and the substrate surface 106 is preferably about 3–4 micrometers. The groove width as measured between the walls 104 of the groove is about 2.0–2.5 micrometers.

In order to generate a metal matrix master, the surface of the photoresist master is coated with a thin conformal, continuous, conducting layer of a metal such as gold, nickel or copper. The metal layer is then electroplated to form a metal electroform. The electroform which can be, for example, nickel or copper, is generally at least about 0.01 inch (0.025 cm.) thick so that it can be self-supporting. The photoresist master is then separated from the metal layer faced electroform and any residual photoresist is removed from the metal layer with a solvent such as acetone.

Figure 2:
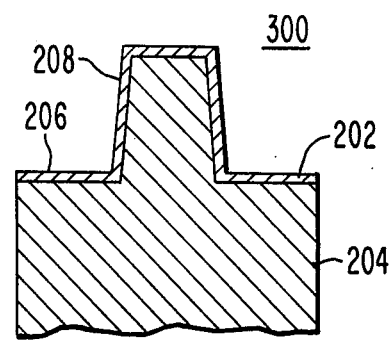
FIG. 2 is a cutaway transverse view of a matrix master made from the photoresist master.

The metal matrix master 300 cutaway transverse view, as is shown in FIG. 2, is the negative of the developed photoresist master. The metal matrix master comprises a first metal layer 202 overlaying a first metal electroform 204. The well-defined edges in the photoresist master are duplicated in the matrix master.

Figure 3:
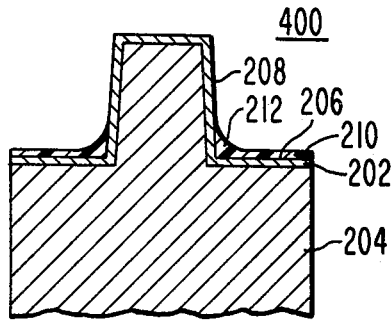
FIG. 3 is a cutaway transverse view of a matrix master which has been filleted according to this invention.

The first metal layer base surface 206 of the metal matrix master 300 is coated with a filleting layer 210 which can form a fillet, that is, a concave junction 212 where the first metal layer wall 208 meets the first metal layer base surface 206. A suitable filleting layer 210 may be formed by spin coating a solution of any suitable material which can fill the corner and form a concave junction 212. The filleted matrix master 400 cutaway transverse view is shown in FIG. 3.

If needed, for further electroplating the filleting layer 210 can be coated with a thin, conformal, conductive second metal layer which may be, for example, gold, copper or nickel. The filleted matrix master is then replicated to form a matrix mold and a stamper. The stamper surface may be cleaned and coated in such a manner as is known in the art to promote the clean separation of the stamper from the material, such as vinyl, from which the lapping discs are stamped.

Figure 4:
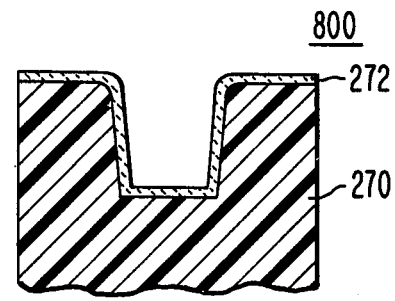
FIG. 4 is a cutaway transverse view of the groove of a lapping disc which results from the use of a filleted matrix master.

A cutaway transverse view of a plastic keel lapping disc groove 800 is shown in FIG. 4. The appropriate groove shape can be formed in the surface of the plastic 270 using the stamper as fabricated above and any convenient plastic forming method such as compression or injection molding. The molded plastic disc is then coated with an abrasive layer 272, such as an abrasive, amorphous silicon oxide, which can be used to lap a dielectric support element fabricated out of a material such as diamond, sapphire and the like.

Figure 5:
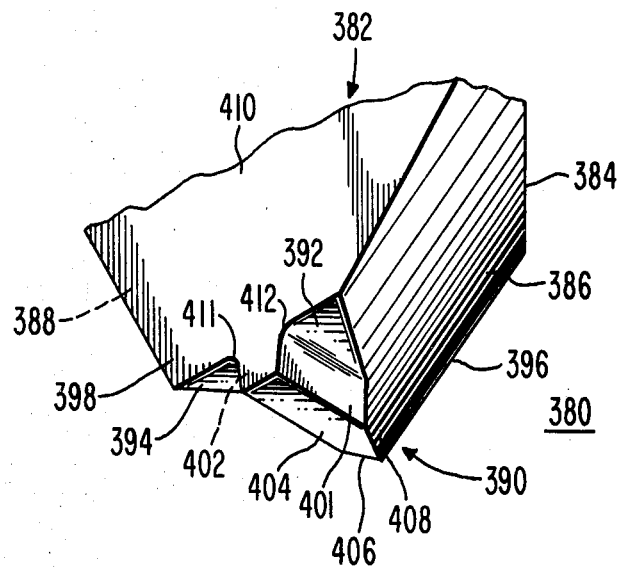
FIGS. 5 and 6 are perspective drawings of a stylus which was fabricated employing this invention.
Figure 6:
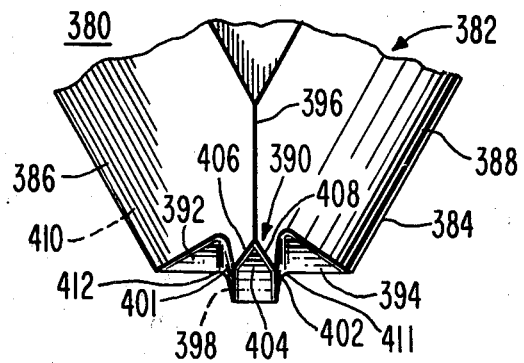

The keel tipped stylus 380, which can be obtained using the lapping disc whose groove profile is shown in FIG. 4 is shown in perspective views in FIGS. 5 and 6. The keel-tipped stylus 380 includes a dielectric support element 382. The dielectric support element 382 comprises a body 384 having bevelled surfaces 386 and 388, a constricted terminal portion 390 and shoulders 392 and 394 joining the bevelled body to the constricted terminal portion.

The constricted terminal portion 390 is defined by a prow 396, a substantially flat rear surface 398 remote from the prow, a pair of substantially parallel side surfaces 401 and 402 extending from the side edges of the rear surface, a bottom surface 404 extending from the bottom edge of the rear surface and a pair of additional surfaces 406 and 408 extending from the prow and intersecting the bottom and the side surfaces. The bottom surface 404 may be shaped to conform to the shape of the video disc groove. The intersection of the rear, the side and the additional surfaces with the bottom surface defines, illustratively, a pentagonal stylus footprint. The keel-tipped stylus is constructed such that an apex of the pentagonal footprint is located on the prow 396. The electrode 410, which covers rear surface 398, is a conducting layer about 1500–2000 angstroms thick. Metals such as titanium, hafnium, tantalum and the like may be used as the conducting layer.

Figure 9:
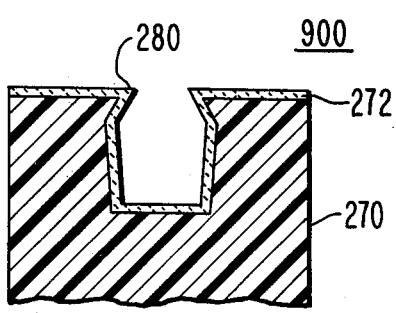
FIG. 9 is a cutaway transverse view of a prior art keel lapping disc.
Figure 10:
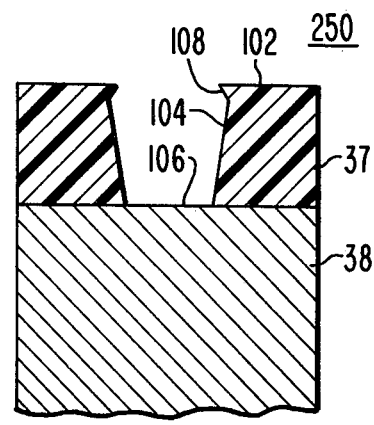
FIG. 10 is a cutaway transverse view of the groove of a photoresist master which was undercut during development.

In the embodiment of FIGS. 9 and 10, the shoulders 392 and 394 are parallel to the bottom surface 404 of the constricted terminal portion 390. Alternatively, the shoulders 392 and 394 may be flared relative to the bottom surface 404. The concave junctions 411 and 412 are present at the intersections of the side faces 401 and 402, respectively with the shoulders 392 and 394, respectively.

Figure 7:
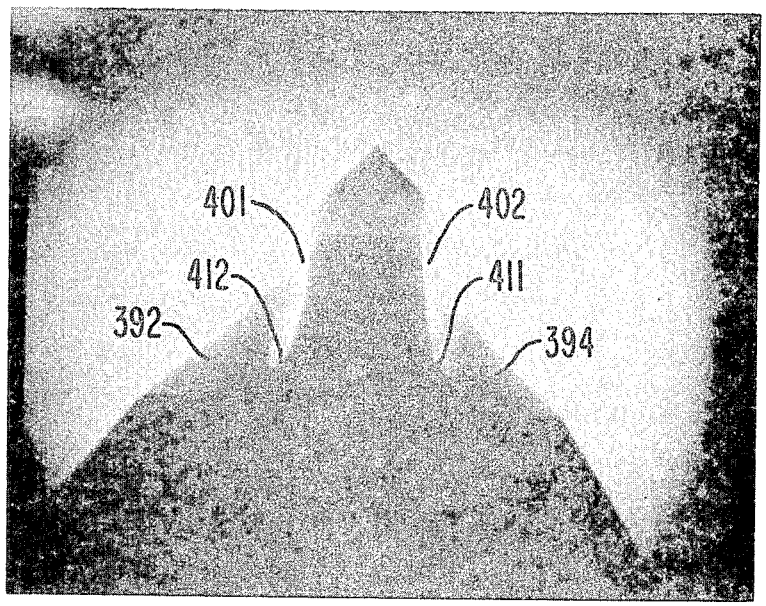
FIG. 7 is a photograph of a stylus incorporating this invention.

Prior to the present invention when the step of forming concave junctions was omitted, styli broke while being used to play back video discs. FIG. 7 is a photograph at $9.23 \times 10^3$ magnification of a keel lapped stylus produced according to the invention. In FIG. 7, with reference to FIGS. 5 and 6, the sides 401 and 402, respectively are straight walled and meet shoulders 392 and 394, respectively by means of concave junctions 411 and 412, respectively.

Figure 8:
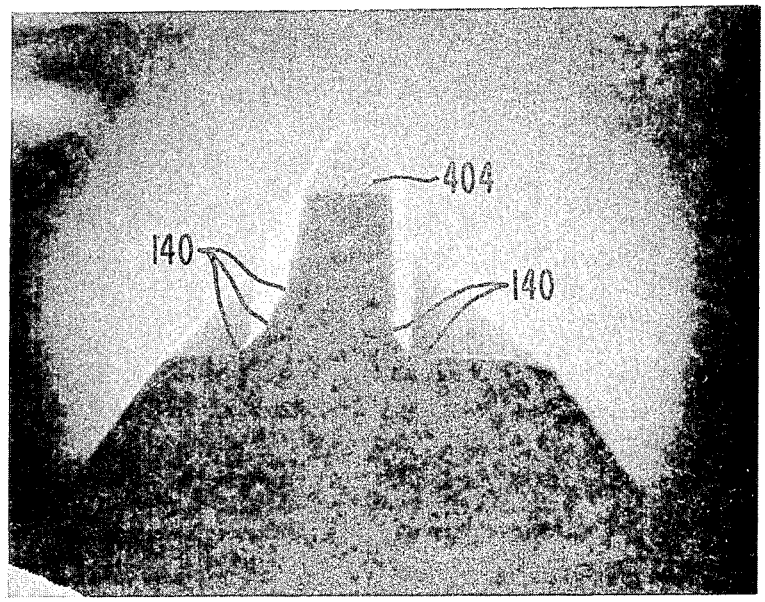
FIG. 8 is a photograph of a prior art stylus.

FIG. 8 is a photograph at $9.3 \times 10^3$ magnification of a control keel lapped stylus where the filleting of the matrix master was omitted. The walls 401 and 402, respectively have indentations 140 before they intersect shoulders 392 and 394, respectively. The indentations 140 are believed to be the cause of stylus breakage. During playback these indentations are weak points where the forces exerted upon the stylus during playback cause the stylus to fail.

The cause of the indentations in the stylus is associated with the molding of the plastic lapping disc. When the stamper is pulled out, the plastic is still hot and flows readily. The plastic at the sharp edge where the walls and the top surface of the disc intersect is distorted by the stamper and forms an overhang. A cutaway transverse view of a groove 900 of a distorted plastic disc 270 is shown in FIG. 9. The overhang 280 corresponds to the indentations 140 shown in FIG. 8. Another unwanted result of the overhang 280 is a narrowing of the bottom surface 404 of the stylus 380 between the side surface 402. This narrowing can be seen by comparing FIGS. 7 and 8.

Formation of the concave junctions also corrects a problem which arises during the photoresist mastering step which interferes with the preparation of the mold. During development following laser recording, some of the developer solvent attacks the unexposed photoresist beneath the surface. This phenomenon is called undercutting. The resulting photoresist master profile 250 is shown in FIG. 10. The walls 104 meet the surface 102 of the resist in a cusp 108. This cusp will be reproduced in the matrix master and can prevent the separation of the electroformed mold from the metal matrix master. Attempts to force a separation may result in damage to the parts and often cannot be accomplished in a manner which permits completion of the replication process.

The formation of concave junctions corrects these problems. The rounded stamper does not produce a sharp edge at the intersection of the top surface and the walls of the vinyl lapping disc, thereby eliminating the formation of an overhang. The formation of the rounded junctions also results in the filling in of the cusp which may have been reproduced in the matrix master if there was undercutting during preparation of the photoresist master. The substitution of the concave junction 212 for the cusp 108 results in a ready separation of the electroformed matrix mold from the metal matrix master since surfaces which are continuous and nonre-entrant are formed. The high capillary action where metal coating surface 206 and the metal coating wall 208 of the metal matrix master meet facilitates concave junction formation.

The spinning speed and the solids content of the filleting solution must be optimized to deposit a filleting layer 210 of a useful thickness. The slower the spinning speed the greater will be the thickness of the deposited filleting layer 210. If the solids content of the solution is too small or the spin speed is too fast, the resulting filleting layer 210 will be too thin. As a result, an insufficient amount of filling in will result, that is, the concave junction 212 radius will be too small. If the solids content is too great or the spin speed is too slow, the resulting coating will be too thick. Consequently, the concave junction 212 radius will be too great. If the concave junction 212 radius is too small, it may be unable to overcome either the cusp or overhanging phenomenon or both. If the concave junction 212 radius is too large, the thick fillet layer 210 will effectively lessen the height of the stylus keel as measured from the shoulders 392 and 394, respectively to the bottom surface 404. The width of the stylus as measured between walls 401 and 402 will also increase as the stylus wears away the bottom surface 404. These effects will result in the stylus having a shorter life. A preferred concave junction height as measured from the metal surface 206 along wall 208 in FIG. 3 is about 0.25–1.0 micrometer.

The preferred filleting material should be able to be applied by spin coating, serve as a substrate for the deposition of a uniform, adherent metal layer such as gold, nickel or copper and maintain its integrity during electroforming with, for example, nickel or copper. A suitable filleting material solution comprises 15 percent weight to volume of 8.5 parts of Alnovol 429-K cresol-formaldehyde novolak resin and 1.5 parts of 2,4-bis(6-diazo-5,6-dihydro-5-oxo-1-naphthalene-sulfonyloxy)-benzophenone dissolved in 2-methoxyethyl acetate which is in turn added to 2-methoxyethyl acetate to form a 10 percent volume to volume solution.

The present invention will be further illustrated by the following Example, but it is to be understood that the invention is not meant to be limited to the details described herein.

EXAMPLE

A 28 percent weight to volume photoresist solution was prepared by dissolving 8.5 parts by weight of a cresol-formaldehyde novolak resin (Alnovol 429-K) and 1.5 parts by weight of 2,4-bis(6-diazo-5,6-dihydro-5-oxo-1-naphthalenesulfonyloxy)benzophenone in 2-methoxyethyl acetate. The solution was spin coated at about 350 rpm onto a finely-machined, 0.5 millimeter thick bright copper layer which had been electroplated onto a 14 inch (35.6 centimeter) diameter, 0.5 inch (1.27 centimeter) thick flat aluminum disc which had been machined smooth. The resulting about 4 micrometer thick photoresist layer was baked in air for 3 hours at 70° C. to remove any residual solvent.

A RCA model LD2186 20 milliwatt He-Cd gas laser with about a 1 millimeter diameter beam having a wavelength of 441.6 nanometers was used as the recording laser in a laser optical recording system. A spiral groove which was 9 micrometers between adjacent track centers was recorded.

Following exposure, the photoresist layer 37 was developed in Shipley AZ1350 aqueous alkaline solvent developer for 3 minutes. After development the photoresist layer 37 was baked at 50° C. for one hour and the substrate 38 was then allowed to cool to room temperature overnight. The groove depth was about 4 micrometers.

The photoresist master was coated with an evaporated gold layer about 1200 angstroms thick. The gold layer was then electroplated to form an about 0.011–0.012 inch (0.028–0.030 centimeter) thick nickel electroform 204. The gold layer 202 was then separated from the photoresist master and any residual photoresist was removed from the gold layer 202 using acetone.

The gold first metal layer base surface 206 was spin coated at 465 rpm with a solution which consisted of a 15 percent weight to volume photoresist solution further diluted with 2-methoxyethyl acetate to produce a 10 percent volume to volume solution.

After the 10 percent photoresist solution was applied, the metal matrix master was spin dried for 1 minute, baked at 50° C. for 1 hour and cooled down to room temperature overnight. A 1200 angstrom second metal layer of gold was deposited over the filleting layer 210 by evaporation. The gold layer was then passivated with an aqueous $K_2Cr_2O_7$ solution (2.5 grams/liter). A second nickel electroform about 0.011–0.012 inch (0.028–0.030 centimeter) was electroplated over the passivated gold layer. The second nickel electroform cleanly separated from the gold to produce the metal matrix mold.

The second electroform surface was passivated and electroplated to form a third nickel electroform about 0.01 inch (254 micrometers) thick. The third electroform was separated to produce a stamper.

The stamper was used to produce vinyl keel lapping discs by compression molding. The discs were coated with an amorphous silicon oxide abrasive layer prepared by glow discharge deposition employing $SiH_4$ and $N_2O$ as starting materials. The diamond styli which were keel lapped did not have any indentations which would shorten their life. Furthermore, the metal parts used in the replication process readily separated from each other without being damaged.

We claim:

1. In a method of replicating a groove pattern in the formation of a lapping disc comprising the steps of:

1. recording the pattern in a photoresist layer,
2. developing the photoresist layer to form a photoresist master,
3. transferring the pattern of the photoresist master to a metal matrix master pattern by coating the photoresist master with a metal to form an electroform, and separating the electroform from the photoresist master to produce the said metal matrix master pattern, and
4. replicating the metal matrix master pattern in the surface of a plastic article;

the improvement which comprises the step of forming concave junctions on the metal matrix master by filling in material at the intersections of the walls and base portions of the metal matrix master.

2. The method of claim 1 wherein a spin coating technique is employed in filling in the metal article.

3. The method of claim 2 wherein a solution of cresol formaldehyde novolak resin and 2,4-bis(6-diazo-5,6-dihydro-5-oxo-1-naphthalene-sulfonyloxy)benzophenone in 2-methoxyethyl acetate is utilized in spin coating the metal layer.

4. The method of claim 1 wherein the groove is trapezoidally shaped.

* * * * *